United States Patent [19]

Williams

[11] 4,117,266
[45] Sep. 26, 1978

[54] RECORDER ACTUATOR FOR COMMUNICATION LINES

[76] Inventor: Richard W. Williams, 2837 S. Raritan, Englewood, Colo. 80110

[21] Appl. No.: 815,313

[22] Filed: Jul. 13, 1977

[51] Int. Cl.² .............................................. H04M 1/64
[52] U.S. Cl. ..................................................... 179/6 R
[58] Field of Search ........... 179/6 R, 6 E, 6 C, 6 AC, 179/2 A, 1 C, 2 C

[56] References Cited

U.S. PATENT DOCUMENTS

| 2,228,673 | 1/1941 | Reeves | 179/6 R |
|---|---|---|---|
| 2,495,769 | 1/1950 | Reeves | 179/6 R |
| 3,492,427 | 1/1970 | Foster | 179/6 AC |
| 3,671,680 | 6/1972 | Nye et al. | 179/6 E |
| 3,712,961 | 1/1973 | Nye et al. | 179/6 E |
| 3,909,538 | 9/1975 | Jacobson | 179/6 R |
| 4,017,686 | 4/1977 | Todd | 179/6 R |

Primary Examiner—Raymond F. Cardillo, Jr.
Attorney, Agent, or Firm—Richard D. Law

[57] ABSTRACT

A connection across telephone lines includes a resistor having a shunted capacitor circuit holding a normally closed relay open and permitting it to close on closing the telephone circuit, by lifting the handset, to activate a recorder. Replacing the handset opens the circuit shutting off the recorder. A current limiting resistance in the recorder switch circuit prevents damage to the relay while the capacitor provides high current for activating the the relay solenoid. A bridge circuit eliminates polarity of the magnetically biased relay.

6 Claims, 3 Drawing Figures

RECORDER ACTUATOR FOR COMMUNICATION LINES

The present invention relates to means and apparatus to monitor telephone calls and more particularly to automatically actuate apparatus for recording telephone conversations.

Recording apparatus designed to pick up and to record telephone conversations is well known, but such apparatus is comparatively complex and is expensive and requires manual control of the recorder. The essence of, and the primary object of the present invention is to provide an adapter, a circuit, hereinafter called an "adapter circuit", which may be connected to the input line of a telephone and to a common tape recorder to permit automatic actuation of phone conversations to be recorded. The adapter circuit will automatically commence operation as soon as the telephone is lifted rom its receiver base and will continue to operate until the telephone is hung up.

While certain segments of the population frown upon recording telephone conversations, it becomes quite important to do so in a number of activities, as where important instructions which must be recorded in some manner are given by telephone. For example, in a hospital, the staff doctors and resident physicians will usually be available at various locations in the hospital, but frequently problems will arise at other locations. Recorded telephone conversations in lieu of written memorandums are more exact as to content and are naturally great time savers. This means that the desirable physical arrangement in such an institution could be a number of recorders, conceivably one at each staff telephone. The cost of using conventional recorder apparatus under such circumstances would be prohibitive, while, on the other hand, the use of simple tape recorders would reduce the cost at a reasonable figure.

Accordingly, another object of the present invention is to provide a novel and simplified adapter circuit for connecting a tape recorder to a telephone which is, in and of itself, a very simple, low cost unit such that the use of tape recorders at institutions, at a number of telephones, becomes a practical and economical arrangement.

Another object of the invention is to provide a novel and improved adapter circuit for connecting a tape recorder to a telephone input line which will not significantly affect the input voltage to the telphone line, and which includes a simple arrangement of relays and pickup components to permit the same to automatically function responsive to the normal voltage drop in the telephone input line whenever the telephone is lifted off its receiver.

Other objects of the invention are to provide a novel and improved adapter circuit for connecting a tape recorder to a telephone input line which, in and of itself, is the essence of simplicity, may be formed as an input plug for the tape recorder for quick connection to and removal therefrom when the tape recorder is needed for other purposes, which may be connected to the phone line by an unskilled person, and which a reliable, maintenance-free unit.

With the foregoing and other objects in view, as hereinafter appear, the invention comprises certain constructions, combinations and arrangements of circuits and interrelated components therein, as hereinafter described, defined in the appended claims, and illustrated in preferred embodiment, in which:

Figure 1:
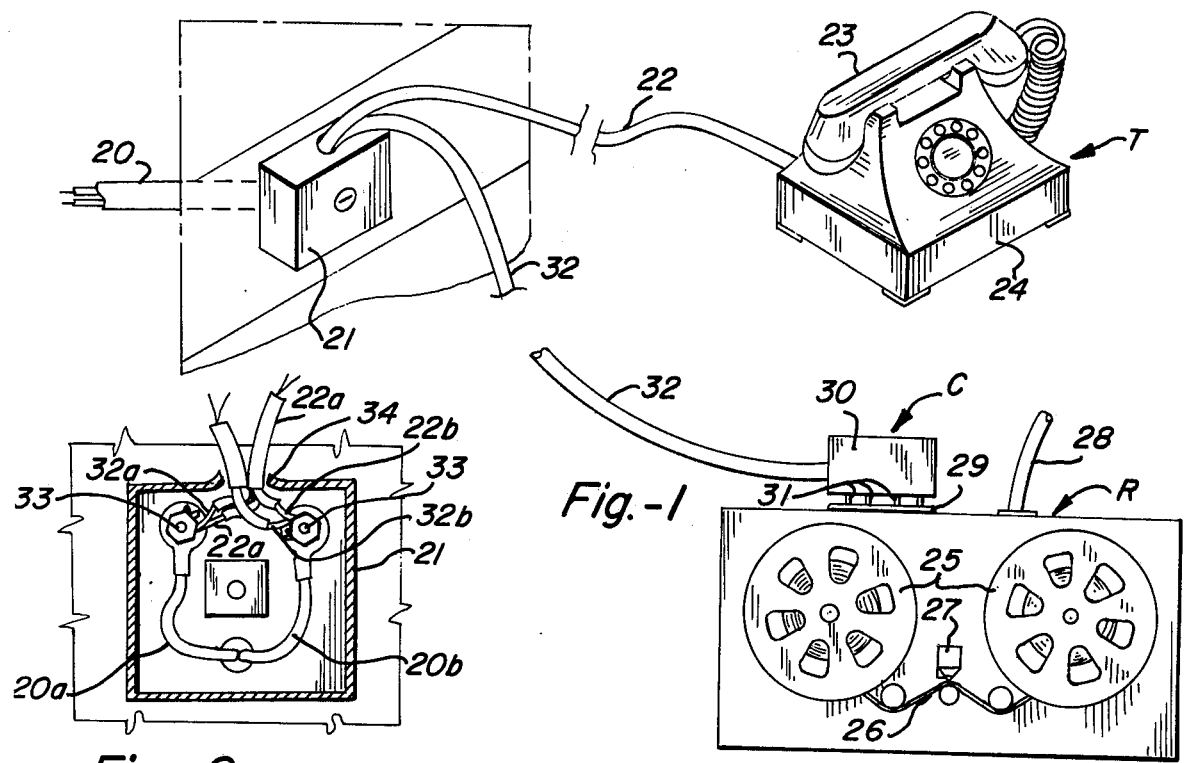
FIG. 1 is a diagrammatic view showing a telephone, its input line commencing at a wall box, and a fragment of the line beyond the box; also, a tape recorder and the improved adapter circuit connecting the tape recorder to the input line.

Referring now to the drawing, FIG. 1 illustrates one mode, ordinarily the preferred arrangement, of securing an adapter circuit C to a telephone input line L and to a tape recorder R, according to the principles of the invention. An input line 20 extends form a remote central station, not shown, to a wall box 21. Thence, the input line continues as in input lead 22 to the telehone T, all in a conventional, common manner. The telephone input line 20 and lead 22 are commonly powdered by an imposed line voltage of about 48 volts when the telephone head set 23 is on its receiver base 24 and with circuits in the telephone being open to draw no current. When the headset 23 is removed form its receiver base 24, circuits in the telephone close to draw current and drop the line voltage to approximately 7 volts.

The conventional tape recorder R will have tape carrying reels 25 which carry a tape 26 past a recorder head 27 as the reels rotate. The drive mechanisms and the recording circuits within the recorder, which are not shown, are conventional and are powered by a common 110 volt A.C. source as from a lead 28. The tape recorder is conventional and the audio-electrical input will ordinarily extend through a cord several feet long to a microphone, not shown. The input connection normally includes two control leads from the recorder which extend to a switch in the microphone. The cord will also include two audio-electrical input leads from the recorder and which extend to a low-voltage transducer in the microphone, all in conventional, well known arrangements. The base of a microphone cord, now shown, is ordinarily formed as a jack plug which fits into a receptical 29 at one side of the recorder R. Other arrangements for connecting the microphone to the tape recorder are used on some models of tape recorders, but the same four leads will be connected from the recorder and to the microphone in essentially the same manner.

These four leads in a microphone cord are replaced by the improved 'adapter circuit' C and one convenient arrangement is to encase this adapter circuit C in a simple, box-like container 30 having the circuit leads within it terminating as prongs 31 which are conveniently fitted into the receptacle 29 on the recorder, as shown at FIG. 1. Thus, the tape recorder can be used with the adapter circuit to record telephone conversations, or it can be quickly and easily disconnected for use with a microphone, for other purposes.

The adapter container 30 will then include a simple, two-wire lead 32 which connects with the wires of the telephone input lead 22. The telephone input lead 22 is an insulated cord carrying a pair of wires 22a and 22b. The cord 32 is also a pair of wires 32a and 32b, with each connecting with a respective lead 22a and 22b.

Figure 2:
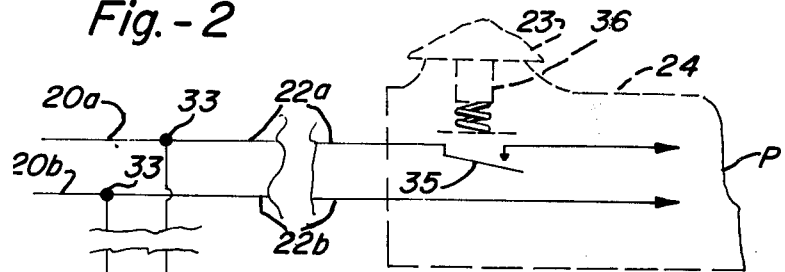
FIG. 2 is a diagrammatic view of the wall box shown at FIG. 1, but with the lid removed to better show the manner in which the adapter circuit leads are connected with the input line leads.

While the connection of lead 32 could be made at any convenient point in lead 22, for example at the telephone, one expedient point of connection is at the wall box 21. FIG. 2 illustrates a typical wall box structure. The leads 20a and 20b of the input conduit 20 enter the box 21 from the wall to extend to a pair of connective terminal posts 33. The cord 22 extends into this box through a top opening 34 and its leads 22a and 22b also connect with the terminal posts 33. The adapter lead 32 may also be extended through the opening 34 so that its leads 32a and 32b can also be connected to the terminal posts 33, all in a neat, compact arrangement.

Figure 3:
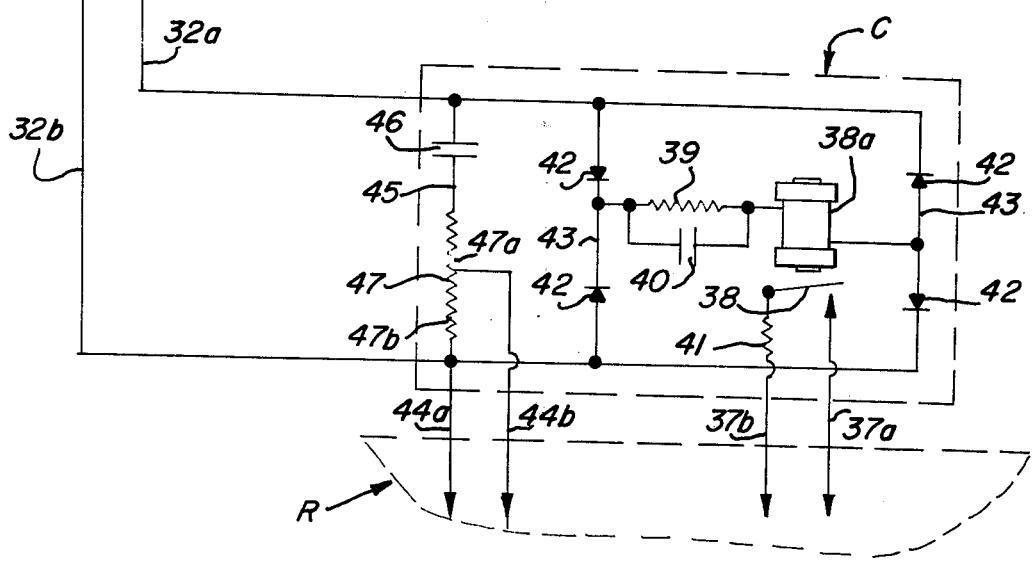
FIG. 3 is a circuit diagram of the basic leads to the telephone, the elements in the improved adapter circuit and the leads connecting with the tape recorder.

The circuit diagram at FIG. 3 is exemplary of the manner in which the adapter circuit C functions. The telephone conduit leads 20a and 20b connect with the telephone input leads 22a and 22b as at terminals 33. The leads 22a and 22b extend to the receiver base 24 of the telephone. One lead, 22a, includes a normally closed switch 35 which is ordinarily held open by the weight of the headset 23 pressing upon a pin 36 in the base 24 which is linked to the switch 35. When this switch is open, when the headset 23 is in place, the line voltage across lines 20a and 20b is about 48 volts. When the headset is lifted to close switch 35 and render the telephone ready for use, the line voltage drops. This line voltage drop is used to operate the tape recorder whenever the headset is lifted as hereinafter appears.

The leads 32a and 32b extend from the posts 33 and to the adapter C in parallel with the leads 22a and 22b and accordingly, all line voltage fluctuations in leads 22a and 22b occurring by use of the telephone will be impressed upon these adapter circuit leads 32a and 32b. Such voltage fluctuations will include the voltage drop when the receiver is lifted and pulses and waves of varying frequency of a small voltage change when the telephone is in use.

The electrical connection of the pair of leads 37a and 37b is controlled by a normally closed relay switch 38 operated by a relay coil 38a to connect the control leads of the tape recorder through the connector means 31 heretofore described, and whenever the relay switch 38 closes or connects these leads 37a and 37b, the tape recorder is operating. The coil 38a of the relay switch 38 shunts leads 32a and 32b and is thus energized by the voltage across the telephone input leads 22a and 22b; however, the current through the coil is reduced by a resistor 39 in series with the coil which is selected to permit only enough current to flow through the relay coil to hold the switch 38 open when a maximum line voltage is applied to conductors 32a and 32b. A capacitor 40 shunts the resistor 39 to sufficient control of the current through the relay coil 38a to open and close switch 38 when switch 35 is opened and closed according to the position of the headset 23 on its receiver base 24 as hereinbefore described. When switch 35 closes, the line voltage between conductors 32a and 32b drops and the voltage previously stored across capacitor 40 dissipates by current discharge through resistor 39 because of the connection of diodes 42. Until the voltage across capacitor 40 dissipates to a level approximately the same as the reduced level an conductors 32a and 32b, no current flows through relay coil 38a thereby quickly releasing any holding effect on switch 38. Switch 38 quickly returns to its normally closed position providing an electrical connection through leads 37a and 37b to activate the recorder R in the manner described. After discharge of capacitor 40 in a low current flows through the relay coil 38a, but this current is unsufficient to open the normally closed contacts 38 because of the current limiting effect of resistor 39 and the reduced voltage at conductors 32a and 32b. After the telephone conversation terminates and the headset 23 is replaced on the receiver base 24 to open switch 35, the maximum voltage on conductors 32a and 32b causes a high level surge current flowing through capacitor 40 and relay coil 38a. The su-ge current causes a rapid opening force on switch 38 disconnecting conductors 37a and 37b, stopping the recorder R. The current flowing through resistor 39, once capacitor 40 is charged, is sufficient to cause relay coil 38a to hold the switch 38 open.

Although several types of relay switches can be used in this arrangement, a reed switch is much preferred because of the economics of manufacture and because of the very small current necessary to operate this adapter circuit C. Since a reed switch is sensitive to current surges, a small resistor 41, or a choke coil if desired, is placed in the loop formed by the recorder operating leads 37a and 37b to prevent the switch contacts from welding together as the switch closes. Also, since a reed switch is sensitive to polarity, the connection between the line voltage leads 32a and 32b and the lead carrying relay coil 38a, resistor 39 and the capacitor 40 is made directional by a bridge circuit, analogous to a full wave rectifier, by the use of opposing sets of diodes 42 in the rectifier leads 43 between leads 32a and 32b. This arrangement permits an individual to hook up the adapter circuit to the telephone input line, as at the wall box 21 without being concerned as to the polarity of the input leads.

The pulses and waves of varying frequency from the telephone to the input leads 22a and 22b ane recorded on the tape recorder through leads 44a and 44b which connect with the recording circuits of the tape recorder as through selected prongs 31 heretofore described. The leads 32a and 32b are closed by a cross lead 45 which has a capacitor 46 to permit only pulses and waves to pass and a resistor 47 which functions as a voltage divider to permit the lead 44b to be properly tapped therein to restrict the output voltage across the leads 44a and 44b to a voltage compatible with the voltages required to operate the recording circuits within the tape recorder. In lieu of the voltage divider, resistors 47a and 47b may be used at opposite sides of the tap point.

The operation of this invention is apparent from the foregoing description. Once the adapter circuit C interconnects a telephone and a tape recorder, and the tape in the tape recorder is properly set, the operation of recording commences as soon as the telephone headset is picked up and continues to operate until the headset is hung up. The tape recorder can also operate to momentarily record ringing of the telephone responsive to a line voltage drop during ringing, and thereby completely monitor all activity encountered by the given telephone.

The commercial designation and values of the several components which may be used in the invention are as follows:

| Designation Number | Item | Value |
|---|---|---|
| 38 | Normally closed reed relay | |
| 39 | Resistor | 20 KΩ |
| 40 | Capacitor | 0.1 N F |
| 41 | Resistor | 3.9Ω |
| 42 | Diode | |

-continued

| Designation Number | Item | Value |
| --- | --- | --- |
| 46 | Capacitor | 0.1 N F |
| 47 | Voltage divider | |
| 47a | Resistor | 270 KΩ |
| 47b | Resistor | 10 KΩ |

I have now described a preferred arrangement of my invention in detail; however, it is to be understood that others skilled in the art may devise and build other equivalent constructions which are nevertheless within the spirit and scope of my invention. Hence, I desire that my protection is limited, not by the details herein disclosed, but only by the proper scope of the appended claims.

What is claimed is:

1. An adapter circuit to connect a tape recorder to the input line of a telephone to initiate recording responsive to the voltage drop in the input line, as from the higher "off" voltage to a lower "on" voltage when the telephone is lifted from its receiver and to cease recording responsive to the voltage rise in the input line, to the higher "off" voltage when the telephone is returned to its receiver, said tape recorder including a starting circuit and a recording circuit, and wherein the adapter circuit comprises:
    (a) a relay means having a coil whose leads shunt the leads of the telephone input line and a normally closed switch in the recorder starting circuit which opens whenever the coil is energized by a limiting current therethrough;
    (b) a resistance means in series with the coil to limit the current through the coil to a value sufficient to hold said normally closed switch open when said "off" voltage is at the input line but to a lower value insufficient to open said switch when the reduced "on" voltage is at said input line; whereby
    (c) said relay switch in the tape recorder starting circuit and is adapted to turn the tape recorder on and off as it closes and opens;
    (d) means to connect said recording circuit with the telephone input line to receive voltage fluctuations in the input line; and
    (e) a capacitance means shunting said resistance means, at one side of the coil, to provide a transient current drop and increase responsive to, respectively, a voltage decrease and increase in the input line when the telephone is lifted off from and returned to its receiver, whereby to provide a positive current drop and increase in the coil to assure action of the switch.

2. The adapter circuit defined in claim 1, including further: a current limit means in said tape recorder circuit to prevent a current surge when the relay switch closes.

3. The adapter circuit defined in claim 2, wherein the current limiting means is a resistor.

4. The adapter circuit defined in claim 1, wherein said relay switch is polarized type, and including a rectifier bridge circuit means in the coil leads to apply a properly directed current to the relay switch regardless of the polarity of the connection of the coil leads with the leads of the telephone input line.

5. The adapter circuit defined in claim 1, wherein said means connecting said recording circuit with the telephone input line includes a potentiometer resistance and a filter capacitor in series shunting the telephone input line and a tap in the potentiometer resistance with the recording circuit.

6. A telephone line actuated recorder operating circuit comprising:
    (a) means for connection to a two conductor telephone line;
    (b) normally closed solenoid actuated relay means connected across the two conductor lines to permit line voltage to hold said relay means open;
    (c) a resistor in one lead to the solenoid of said relay means to limit holding current and a parallel capacitor with said resistor providing relay operating current;
    (d) a bridge circuit means in the leads of said relay means for eliminating polarity in said relay means;
    (e) a pair of leads to a recorder switch circuit connected to the relay means; and
    (f) resistor means in said pair of leads limiting current drain from the recorder.

* * * * *